Figure 1:
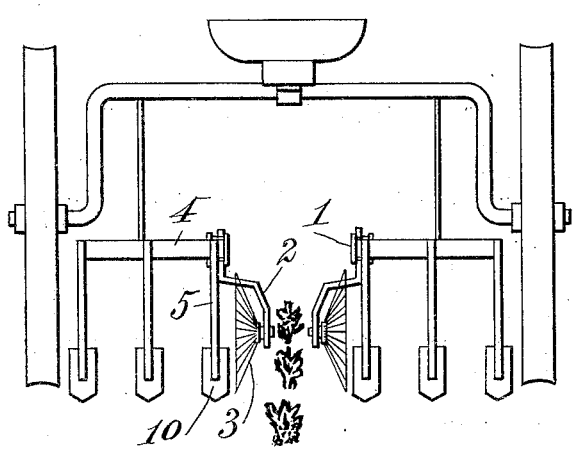

S. H. GARST.
SHIELD FOR CULTIVATORS.
APPLICATION FILED MAY 23, 1919.

1,349,419.

Patented Aug. 10, 1920.
2 SHEETS—SHEET 1.

S. H. GARST.
SHIELD FOR CULTIVATORS.
APPLICATION FILED MAY 23, 1919.

1,349,419.

Patented Aug. 10, 1920.
2 SHEETS—SHEET 2.

Witness
Inventor
Stephen H. Garst.
By
his Attorney

UNITED STATES PATENT OFFICE.

STEPHEN H. GARST, OF MOLINE, ILLINOIS.

SHIELD FOR CULTIVATORS.

1,349,419.  Specification of Letters Patent.  Patented Aug. 10, 1920.

Application filed May 23, 1919. Serial No. 299,178.

*To all whom it may concern:*

Be it known that I, STEPHEN H. GARST, a citizen of the United States, residing at Moline, in the county of Rock Island and State of Illinois, have invented certain new and useful Improvements in Shields for Cultivators, of which the following is a specification.

This invention relates to a new and useful shield or fender for soil cultivators and tillage machines.

The object of the said invention is to provide a shield or fender the effective side of which presents an inclined surface to the plant being cultivated according to the condition of the soil or the plants.

It is the practice to cultivate the soil near the plants, especially when they are small, because at that time the roots are short and are not liable to be broken off or damaged if close cultivation is done at such time. When the plants are small they are more liable to be covered up by the soil in cultivation as it is moved by the forward shovel. In order to cultivate close or near the row of plants with the greatest safety to the plants, the shields must be set close to the shovels on each side of the plant row.

When the plants are small or during early cultivation it is desirable that the shields should occupy the position shown in Fig. 1 of the drawings, but in the case of larger plants or later tillage or cultivation, the positions of the shields should be reversed so that the hollow sides face the plants. In later cultivation larger shovels are used which move the soil toward the plants and form a ridge of loose earth on the side of the row of plants which is commonly called "hilling up." In such case it is advisable to raise the shield or shields higher than for early cultivation to allow a greater amount of the soil to move up to the plants. The shield in such case acts as a fender to protect the plants from being covered up by the ridge of soil made by the larger shovels. In later tillage the soil has been cultivated several times and is usually in good condition, therefore, it can be moved toward or near the plants in large volumes. In this case the shield acts as a fender and protects the plant from the large volume of earth that flows off the shovel and the same is deposited around the plant at the surface of the ground. The shield with its convex side facing the plants, or in other words, its hollow side facing in the direction of the row of plants, acts as a fender to hold up the branches of and protect the plants while the stream of soil moved by the shovel deposits the soil around the plant stems. In this case the shield is set higher than in the cultivation of small plants and the concave or hollow faces toward the plants or away from the shovel. The shield or fender in either case presents an inclined surface to the soil and prevents the earth turned up by the shovels from engaging the plants with too great a force or covering them up more or less. In performing the functions thereof the shield or fender may be constructed in various ways and the hollow form or concavo-convex character, due to off-setting the rim and hub thereof be maintained. This off-setting of the rim and hub is necessary in order to present an inclined or slanting surface of the shield or fender to the plants.

In the case of small plants or early cultivation the lower part of the shield is under the soil delivered by the shovel and as the shield revolves the soil against it or in it is turned over with the result that the said shield acts as a revolving screen which breaks up and pulverizes the soil delivered to it and thereby causes more of the soil to pass through the shield than there would be if the shield stood perpendicular, and separates the fine from the coarse soil. This action increases the capacity of the shield and produces more thorough cultivation and weed destruction.

A further object of the invention is to provide a shield or fender for this work with means for adjusting the openings therein to suit different characters of soil.

Having pointed out the objects and purposes of the invention, reference is now made in general terms to the accompanying drawings which illustrate modified forms of the shield all of which have in mind the essential concavo-convex, slanting or inclined form of the shield surface.

Figure 2:
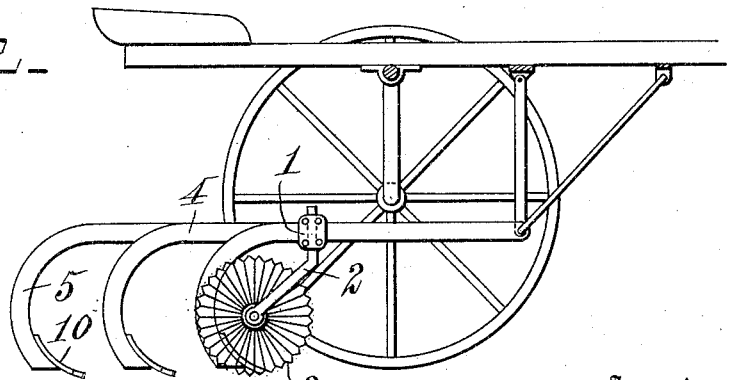
Figure 3:
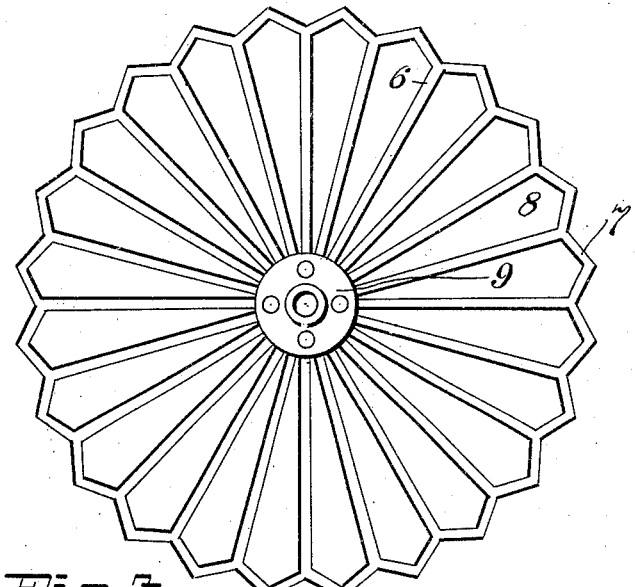
Figure 4:
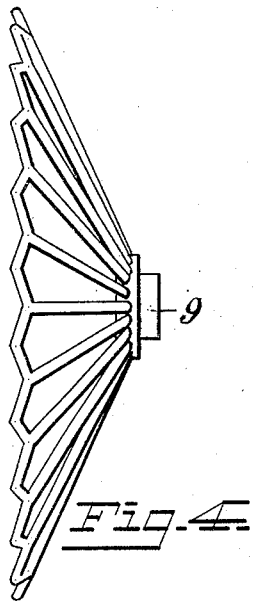
Figure 5:
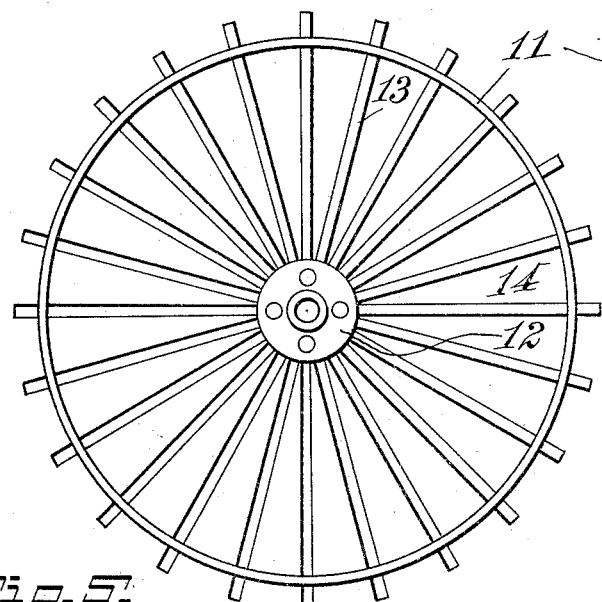
Figure 6:
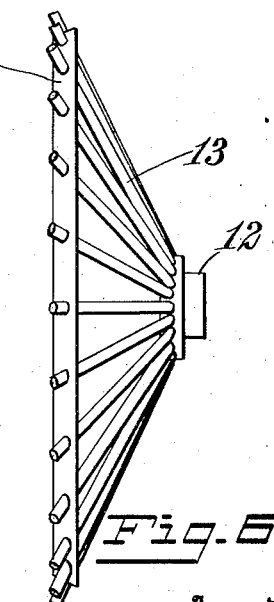

Of these drawings, Figure 1 is a rear elevation of main parts of a cultivation frame, and the beams or shovel standards to which my improved shield is attached. The position of the shields being that suitable for early cultivation. Fig. 2 is a side elevation thereof. Figs. 3 and 4 are detail views of the shield on a larger scale. Figs. 5 and 6 are similar views of shields of modified form.

In Fig. 1 the shields are shown attached to both sections of a cultivator on both sides of a row of plants, the attachment is made by means of any well known form of clamping plates 1, which hold the supporting arms 2 of the shields 3 to the cultivator beams 4 to which the shovel arms 5 are attached. The plates 1 may be adjusted up or down to enable the shield to press light or heavy on the soil as the case may require. The said plates are a standard article, and therefore require no extended description or more than a brief illustration which is also true of the cultivator as a whole, the purpose of the illustration being to show the relative positions of the shields and their structural characteristics. The essential feature of the shield is its concavo-convex, slanting or inclined form. It may be made in various ways and this essential characteristic preserved. In Figs. 3 and 4 of the drawings the shield 3 is made of cast metal in one piece, or it may be stamped from a blank of suitable sheet metal. As there shown it consists of a series of flat radial spokes or bars 6, which terminate in an integral rim 7 of corrugated form to give the shield suitable traction. The bars 6 incline uniformly on one side from the hub to the rim and inclose a corresponding number of radial spaces 8, and the inner ends of said bars unite with a hub 9 which has a bearing in the lower end of the supporting arm 2. The concave or hollow side of the shield may face the shovel 10 or away from it. In either case the space or room between the shovel and the shield allows the soil delivered by the shovel a chance to spread out over the lower half of the shield and a tendency to pulverize them. The fine soil passes through the openings in the shield and the clods arrested by the bars of the shield roll away from the row of plants.

In Figs. 5 and 6, the shield is shown to consist of a rim 11 which is off-set from the hub 12 and the two united by a series of inclined spokes or rods 13 to provide the open spaces 14 and the conical form of the shield. In this form of shield the spokes or rods 13 extend through the rim 11 and provide the necessary traction capacity. The forms of the shield thus far described provide for openings of fixed areas but it is possible to provide a shield with means whereby the openings may be varied or decreased and increased in accordance with the character of the soil to be cultivated and the condition of the plants.

Having described my invention, I claim:

A shield for cultivators consisting of a hub, a rim having projections for engaging the soil, the said rim being offset from the hub, and bars uniting the hub and the rim, said bars being on angles due to the rim being offset from the hub, and providing a series of open spaces between the rim and the hub, substantially as specified.

In testimony whereof I affix my signature.

STEPHEN H. GARST.

Witnesses:
 BARBARA E. GARST,
 HUBERT BURGIS.